United States Patent [19]

Johnson et al.

[11] Patent Number: 4,514,739
[45] Date of Patent: Apr. 30, 1985

[54] CROSS SCAN BEAM POSITIONER FOR MULTIPLE CHANNEL LASER ROS

[75] Inventors: Richard V. Johnson, Pasadena; William D. Turner, San Marino, both of Calif.

[73] Assignee: Xerox Corporation, Stamford, Conn.

[21] Appl. No.: 548,061

[22] Filed: Nov. 2, 1983

[51] Int. Cl.³ .................. G01D 9/42; G02F 1/01; H04N 3/08
[52] U.S. Cl. .................. 346/108; 350/356; 358/208
[58] Field of Search ............ 346/76 L, 108; 358/293, 358/206–208; 350/6.7, 6.8, 356

[56] References Cited

U.S. PATENT DOCUMENTS

| | | | |
|---|---|---|---|
| 3,964,032 | 6/1976 | Bardos | 350/6.8 X |
| 4,281,904 | 8/1981 | Sprague et al. | 350/356 |
| 4,323,906 | 4/1982 | Ohnishi et al. | 346/108 X |
| 4,403,833 | 9/1983 | Kenan et al. | 350/356 |
| 4,419,676 | 12/1983 | Lenk et al. | 346/108 |
| 4,423,426 | 12/1983 | Kitamura | 346/108 |
| 4,477,821 | 10/1984 | Yamamoto et al. | 346/108 |

*Primary Examiner*—George H. Miller, Jr.
*Attorney, Agent, or Firm*—Leonard Zalman

[57] ABSTRACT

A multi-channel laser ROS scanner for simultaneously scanning laser beam components across multiple lines of a photosensitive surface including apparatus for determining deviations in the position of the surface from a desired position due to undesired photosensitive surface velocity variations whereby an error correction signal can be generated, and a TIR modulator having a plurality of interdigitated, addressable drive electrodes. The total number of drive electrodes $N_t$ of the TIR modulator is greater than the collective number of drive electrodes $N_s$ needed to provide the desired pixel resolution for all of the simultaneously scanned lines. When the photosensitive surface is maintained at a desired velocity, such velocity being determined in a conventional manner by system parameters, the surface is correctly positioned and $N_s$ adjacent drive electrodes located generally centrally within the TIR electrode configuration are addressed by the video data signals for the multiple scan lines, causing the laser beam components to exit the TIR modulator with an unshifted or "normal" propagation direction within the optical window of the modulator resulting in scan lines being recorded at desired positions on the photoreceptive surface. Should the photosensitive surface deviate from its desired position at a given time, the error signal functions to cause $N_s$ different adjacent drive electrodes to be addressed whereby the laser beam components exiting the TIR modulator are shifted in propagation direction such that they strike the photosensitive surface at a placement which corrects for the position deviation.

3 Claims, 7 Drawing Figures

CROSS SCAN BEAM POSITIONER FOR MULTIPLE CHANNEL LASER ROS

BACKGROUND OF THE INVENTION

One type of conventional raster out scanner (ROS) system writes data or graphics by a single laser beam which is scanned by a rotating polygon across each scan line position of a charged photosensitive surface such that discrete scan line positions of the drum are discharged. Higher resolution, higher performance laser ROS systems will require much higher data rates than conventional systems and much higher polygon rotation speeds, assuming existing single channel ROS architectures. A multi-channel scanner architecture wherein several scan lines are scanned at once will significantly reduce both the high data rate per channel and high scan rate speed problems since the scan speed of each scan spot can be slowed down whereby each data spot or pixel of a scan line can dwell on the photosensitive medium surface for a longer time period compared to the equivalent single channel configuration. TIR modulators are well suited for multi-channel output scanners and have been proposed for such systems.

A drawback of multi-channel scanners is that errors in photoreceptor speed will have a longer time to build up corresponding errors in placement of the next group of scan lines with respect to the last group of scan lines. There is, therefore, need for a multi-channel scanner that will rapidly shift the position in the slow scan direction of each group of scan lines relative to the preceeding group of scan lines in response to detected changes or errors in photosensitive surface position resulting from undesired photosensitive surface velocity variations.

SUMMARY OF THE INVENTION

A multi-channel laser ROS scanner for simultaneously scanning laser beam components across multiple lines of a photosensitive surface including apparatus for determining deviations in the position of the surface from a desired position due to undesired photosensitive surface velocity variations whereby an error correction signal can be generated, and a TIR modulator having a plurality of interdigitated, addressable drive electrodes. The total number of drive electrodes $N_t$ of the TIR modulator is greater than the collective number of drive electrodes $N_s$ needed to provide the desired pixel resolution for all of the simultaneously scanned lines. When the photosensitive surface is maintained at a desired velocity, such velocity being determined in a conventional manner by system parameters, the surface is correctly positioned and $N_s$ adjacent drive electrodes located generally centrally within the TIR electrode configuration are addressed by the video data signals for the multiple scan lines, causing the laser beam components to exit the TIR modulator with an unshifted or "normal" propagation direction within the optical window of the modulator resulting in scan lines being recorded at desired positions on the photoreceptive surface. Should the photosensitive surface deviate from its desired position at a given time, the error signal functions to cause $N_s$ different adjacent drive electrodes to be addressed whereby the laser beam components exiting the TIR modulator are shifted in propagation direction such that they strike the photosensitive surface at a placement which corrects for the position deviation.

DETAILED DESCRIPTION OF THE INVENTION

Figure 1:
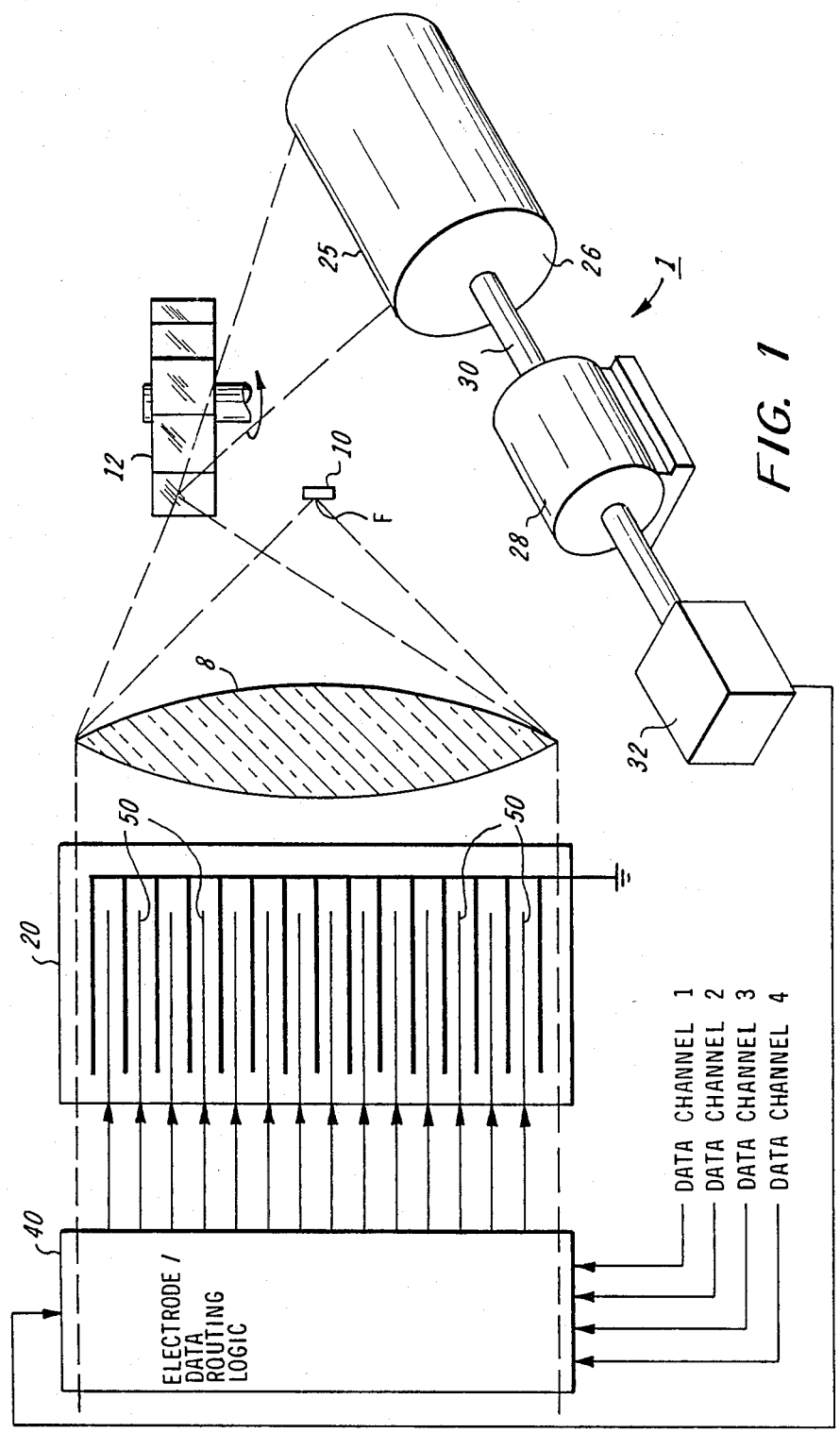
FIG. 1 is a system diagram incorporating the subject invention.

Turning now to the drawings, and at this point especially to FIG. 1, there is shown an electro-optic scan line printer 1 comprising a multi-gate light valve 20 for exposing a photosensitive recording medium 25 in an image-wise configuration. Recording medium 25 is depicted as being a photo-conductively coated xerographic drum 26 which is rotated by a motor 28 in the direction of the arrow. It nevertheless will be evident that there are other xerographic and non-xerographic recording media that could be used, including photo-conductively coated xerographic belts and plates, as well as photosensitive film and coated paper in web or cut sheet stock form. The recording medium should, therefore, be visualized in the generalized case as being a photosensitive medium or surface which is exposed in an image-wise configuration while advancing in a cross line or line pitch direction relative to the light valve 20.

Modulator 20 receives video data drive voltage signals from electrode/data routing logic 40 and is illuminated by a light beam 6. When the modulator 20 is turned off, that is, when data drive signals are not altering the refractive index of any portion of the crystal of the modulator 20, the plural beam components of beam 6 exiting the modulator 20 have a directional propagation which causes them to be focused by a field lens 8 at a position "F". A light stop 10 is located at focus position F such that the stop 10 intercepts the beam components when no data is to be written or recorded on the photosensitive medium 25. Those light beam components not intercepted by stop 10 due to changes in the directional propagation of those light beam components associated with modulator channels being addressed during data recording are reflected by the facets of a spinning polygon scanner 12 which sweeps those light beam components across appropriate respective scan lines of the moving photosensitive surface 25. Associated with the shaft 30 of drive motor 28 is apparatus/circuitry 32 for determining the instantaneous position of the surface 25 and for generating an error signal when that instantaneous position deviates from the design parameters of the printer 1. The error signal is supplied to the logic 40 to correct for that deviation as discussed hereinafter.

The system configuration described in relation to FIG. 1 is a dark field system which blocks all light rays when the modulator is turned off. The invention is equally applicable to a bright field system wherein the stop F is replaced by a narrow slit in an otherwise opaque surface located in the plane of stop F. When the modulator of a bright field system is turned off, all light squeezes into the narrow slit and is directed to the photosensitive surface, that is, all modulator channels of a bright field system are on when no data drive signals are applied to the modulator. When a modulator channel is addressed in a bright field system, it causes the light to shift in propagation direction so that it misses the narrow slit and hits the opaque surface, thereby being prevented from recording on the photosensitive surface.

Figure 2:
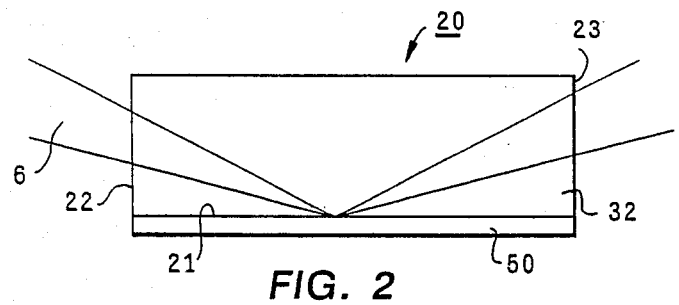
FIG. 2 is a cross-sectional view of the modulator of the system of FIG. 1.

As further shown in FIGS. 1 and 2, the light valve 20 includes an electro-optic element 32 and plural interdigitated, addressable drive electrodes 50. For a total internal reflection (TIR) mode of operation, as illustrated, the electro-optic element 20 typically is a Y cut crystal of, say, LiNbO$_3$ having an optically polished reflecting surface 21 which is integral with and disposed between optically polished input and output faces 22 and 23, respectively. The electrodes 50 are intimately coupled to the electro-optic element adjacent the reflecting surface 21 and are distributed across essentially the full width thereof. Typically, the electrodes 50 are 1–200 microns wide and are on centers which are more or less equidistantly separated to provide a generally uniform interelectrode gap spacing of 1–200 microns. In this particular embodiment, the electrodes extend generally parallel to the axis of the optical system and have portions of substantial length along that axis. Alternatively, the electrodes could be aligned at the so-called Bragg angle relative to the optical axis of the optical system. As will be appreciated, if the electrodes are aligned parallel to the optical axis of the optical system, the light valve 20 will produce a diffraction pattern which is symmetrical about the zero order diffraction component. If, on the other hand, the electrodes are at the Bragg angle relative to the optical axis of the optical system, the light valve will produce an asymmetrical diffraction pattern.

It is noted that the incident light beam 6 illuminates all of the electrodes 50 to essentially fill the full width of the electro-optic element 20. Preferably, the light beam 6 is substantially collimated lengthwise of the modulator and is brought to a wedge-focus at surface 21 along a line that extends widthwise of the electrodes. As is well known, when voltages are applied across electrode pairs of a TIR modulator, an electric field penetrates into the crystal of the modulator adjacent those electrode pairs. Because such electric fields are periodic, and because the modulator crystal is electro-optic, an optical phase grading is established adjacent those electrode pairs which will diffract a light beam incident thereon.

Figure 3A:
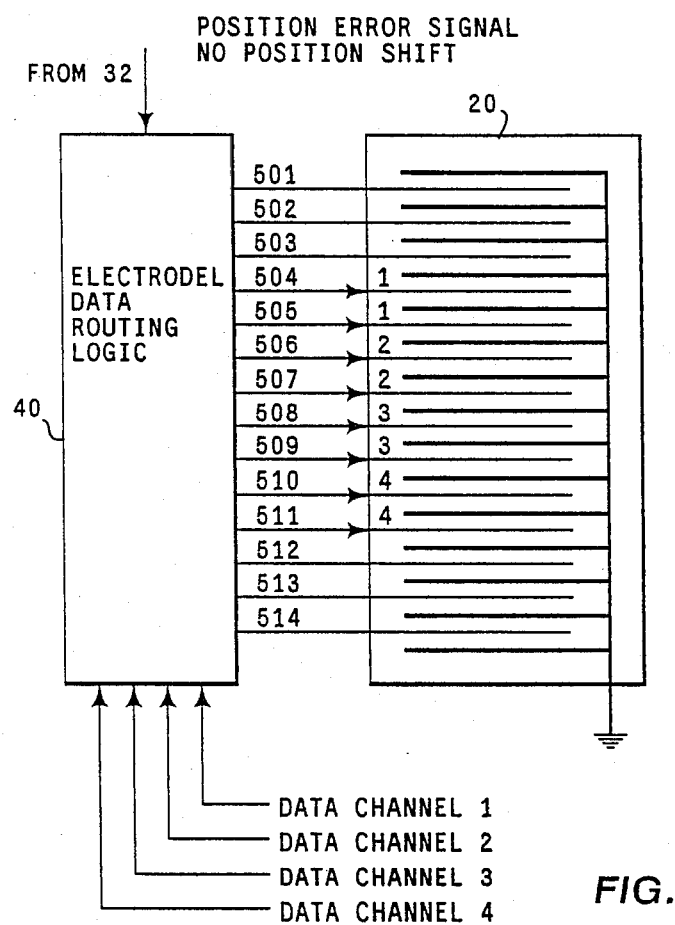
FIGS. 3a, 3b and 3c depict error correction switching aspects of the logic/modulator portion of the system of FIG. 1.
Figure 3B:
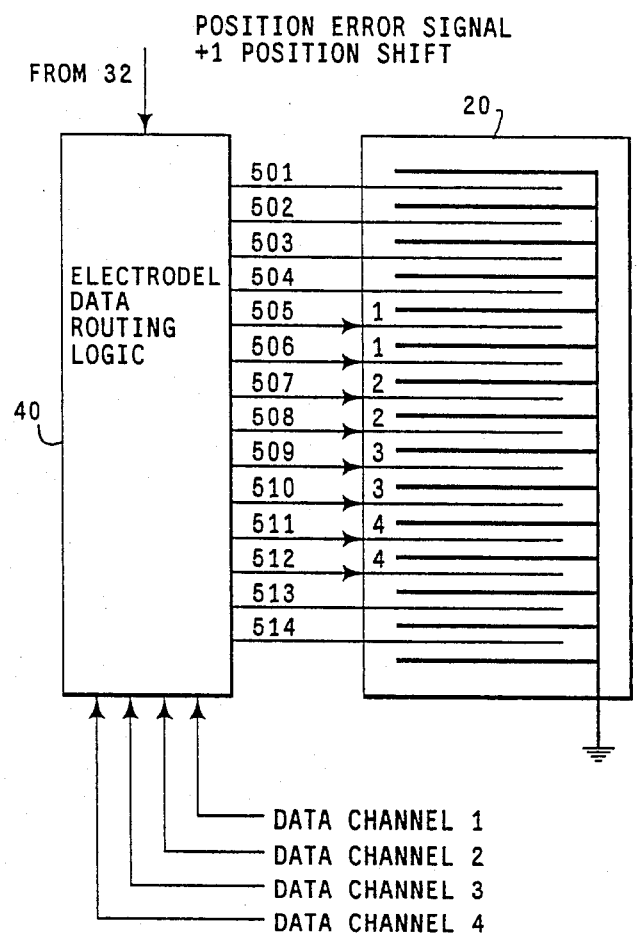
Figure 3C:
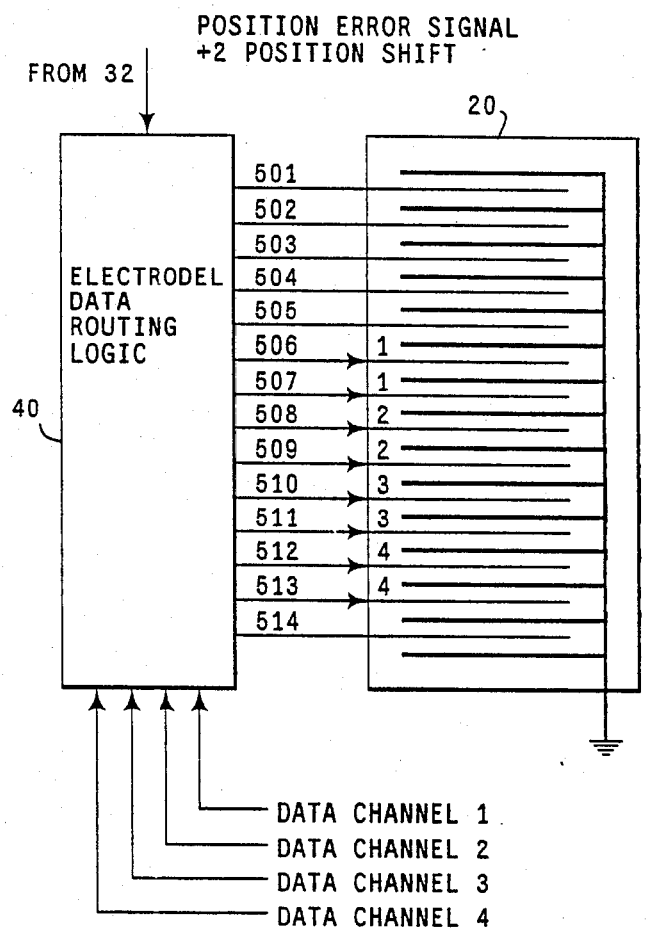

Referring further to the modulator 20, alternate ones of the electrodes 50 are grounded or set at some other appropriate reference voltage while the other of the electrodes are capable of being addressed by data drive signals. The total number of drive electrodes $N_t$ is greater than the number of drive electrodes $N_s$ needed to provide the desired pixel resolution at the photosensitive surface for all of the lines simultaneously scanned. Specifically, if it is assumed that two (2) addressable drive electrodes are needed to define desired pixel resolution at the photosensitive surface for each scan line, and that four video data signal channels permit four scan lines to be scanned simultaneously, then $N_t$ would be greater than 8, for example, electrodes 50 might include fourteen addressable drive electrodes 501–514 as shown in FIG. 3. The greater number of addressable drive electrodes provides the capability for scan line position adjustment due to photosensitive surface position deviations as now explained in detail in reference to FIGS. 3a, 3b and 3c. The exact value of $N_t$ will depend upon how great the position errors are expected to be, greater position errors requiring a greater value of $N_t$.

Figure 4:
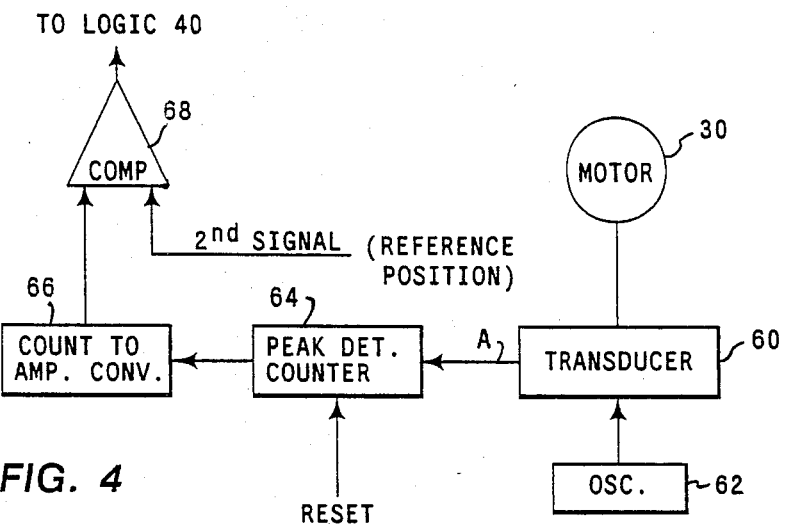
FIGS. 4 and 5 are block diagrams of components of the system of FIG. 1.

Continuing with the assumptions that two addressable drive electrodes make up a data channel that will provide desired pixel resolution and that the scanner receives four video data channel signals, and with the further assumption that line position errors are applied as digital numbers in increments of ½ channel width, when the line position signal error is zero (indicating no photosensitive surface position error) the routing logic causes the channel 1 information to be applied to electrode pair 504 and 505, channel 2 information to be applied to electrode pair 506 and 507, channel 3 information to be applied to electrode pair 508 and 509, and channel 4 information to be applied to electrode pair 510 and 511, as shown in FIG. 4a. For a position error of +1 (½ scan line), the data for channels 1 through 4 is routed to different electrodes as shown in FIG. 4b, specifically, channel 1 information to electrode pair 505 and 506, channel 2 information to electrode pair 507 and 508, channel 3 information to electrode pair 509 and 510, and channel 4 information to electrode pair 511 to 512. For a position error of +2 (1 scan line), the data for channels 1 through 4 is routed once again to different electrodes as shown in FIG. 4c, specifically, channel 1 information to electrode pair 506 and 507, channel 2 information to electrode pair 508 and 509, channel 3 information to electrode pair 510 and 511, and channel 4 information to electrode pair 512 and 513. Similarly, negative position errors will cause the drive electrode assignments to shift up rather than down. Application of the channel information to different electrode pairs in response to photosensitive surface position errors causes the light beam components to exit the TIR modulator with adjusted propagation directions such that they are directed to the scanner at adjusted angles to thereby provide desired line placements on the photosensitive surface.

Since the rotary position of shaft 30 is indicative of the rotary position of surface 25, apparatus/circuitry 32 could include, for example, apparatus for sensing the rotary position of shaft 30 as well as apparatus for providing an electrical indication of any positional error. An example of such apparatus is illustrated in block diagram form in FIG. 4 which includes a conventionally constructed Inductosyn-type transducer unit 60 having a moveable portion which is coupled for rotation with shaft 30 and a portion which is positionally fixed. The moveable portion includes a winding which has a plurality of substantially parallel conductors arranged in a circular array, each series connected to the next adjacent conductor whereby adjacent conductors of the winding carry currents in opposite directions. The circular array is concentric with its axis of rotation. A high frequency oscillating signal is applied to the winding by means of an oscillator 62. The movable portion in actual practice is an insulating disk having the winding deposited on it in the form of a metallic layer which is then fixed to shaft 30 for rotation. The fixed portion of transducer 60 consists of a circular array of parallel conductors similarly arranged to those of the moveable portion. However, the fixed portion includes two sets of segmental windings in space quadrature; in other words, a 90° space difference.

Relative movement of one of the windings with respect to the other produces a change in the output signal A of transducer 60. Such output signal A is in the form of a modulated carrier signal having as a carrier frequency the signal generated by oscillator 62. Its envelope contains information as to both the displacement position of one of the windings with respect to the other, or in other words, the rotation position of shaft 30, along with velocity information.

Generation of a position signal by the foregoing means is well known in the art. Basically, the position signal senses rotation by reason of the fact that when a conductor of one winding is equadistant from the two conductors of the facing winding a null will be produced. Similarly, maximum positive and negative peaks will be produced during alignment of one conductor of one winding with a conductor of the juxtaposed winding. It is therefore apparent that the total rotary displacement of the shaft 30 may be determined by counting the number of alternations or peaks. Accordingly, the output A of transducer 60 is supplied to a peak detector/counter 64 which provides at each instant a count of the number of peaks of the output signal A, the count being reset to zero for each revolution of surface 25, for example, by a magnetized portion of surface 25 or drum 26 passing a pickup coil. The count is converted by a frequency to amplitude converter 66 to a dc signal having an amplitude indicative of the count and that signal is supplied to a comparator 68 which also receives a second dc signal having an amplitude indicative of the desired position of surface 25, such second dc signal being generated by, for example, counting the pulses of a reference clock which is reset at the beginning of each revolution of surface 25 and converting that count on a continuous basis to a representative amplitude. The difference between the amplitude of the two dc signals is proportional to the error signal and that signal is the error signal supplied to logic 40.

Routing logic 40 could comprise conventional logic including a barrel shifter arrangement for applying the data channel information to selected electrodes 50 in accordance with the amplitude of the error signal.

Figure 5:
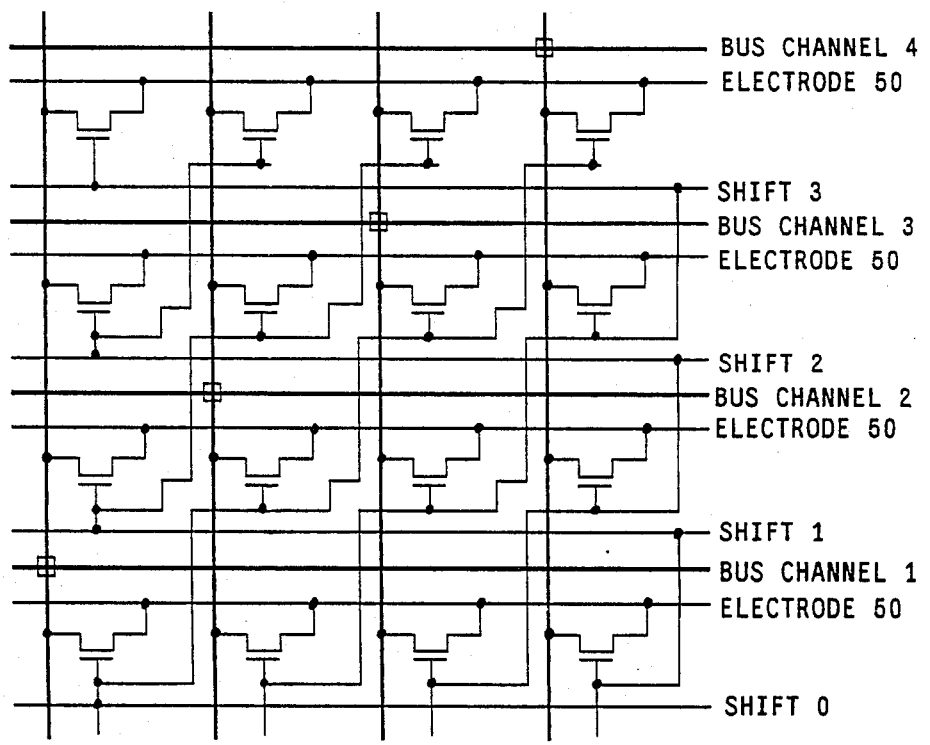

Logic 40 has a construction which dictates that any data channel bit be available at any electrode 50. Therefore, data channel information paths of logic 40 will run at right angles to the electrode output positions and, thus, it is seen that logic 40 is in actuality a multibit shifter, as shown in FIG. 5. The shifter is basically a crossbar switch with individual MOS transistors acting as the crossbar points, the basic idea being that each switch connects a bus to an output electrode. The gate connections needed to perform the barrel shift are also shown in FIG. 5. Although FIG. 5 depicts only a 4-by-4 barrel shifter, a larger barrel shifter would be constructed with the same basic arrangement.

We claim:

1. A light scanning system capable of simultaneously scanning light modulated in accordance with multiple data channels across multiple lines of a photosensitive surface which surface may have position errors including:

a total internal reflection modulator having a number of addressable electrodes greater than the collective number of addressable electrodes needed to provide the desired pixel resolution for all of the simultaneously scanned lines, means for developing an error signal indicative of any positional error of said photosensitive surface, and means responsive to said error signal for applying data channel drive signals to different ones of said electrodes depending upon the value of said error signal.

2. The system of claim 1 wherein the system is operated as a dark field system.

3. The system of claim 1 wherein the system is operated as a bright field system.

* * * * *